Figure 4:
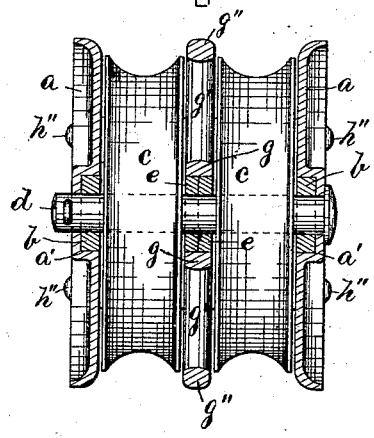

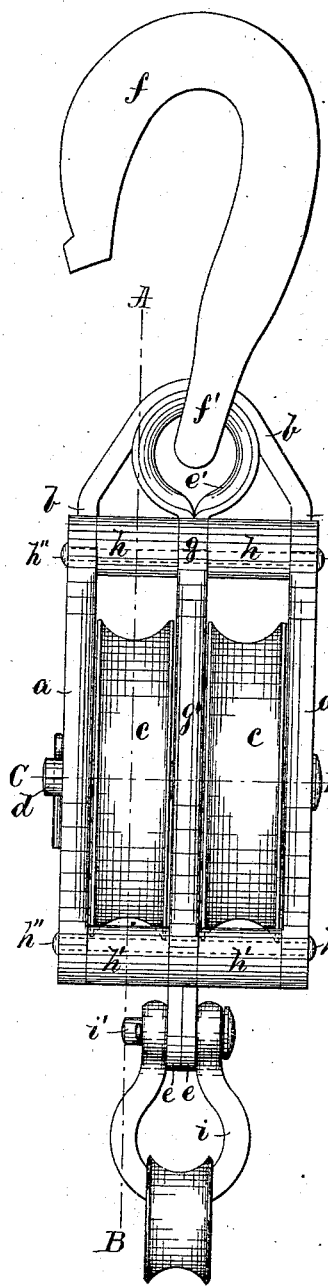
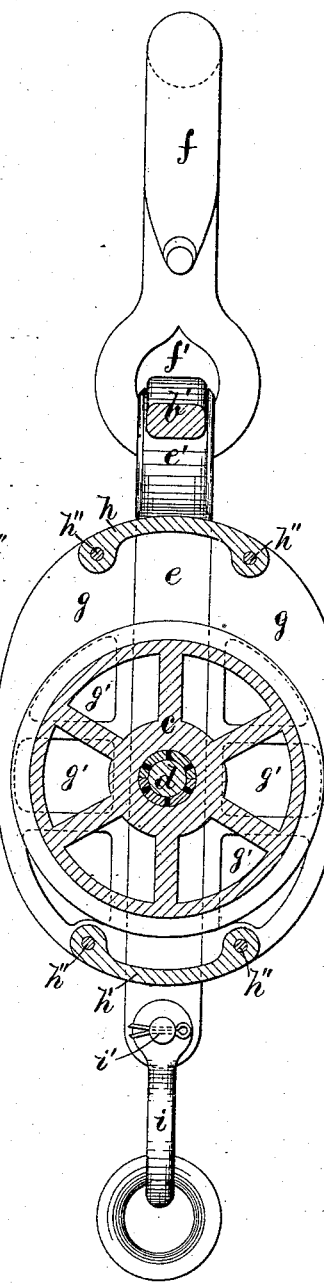
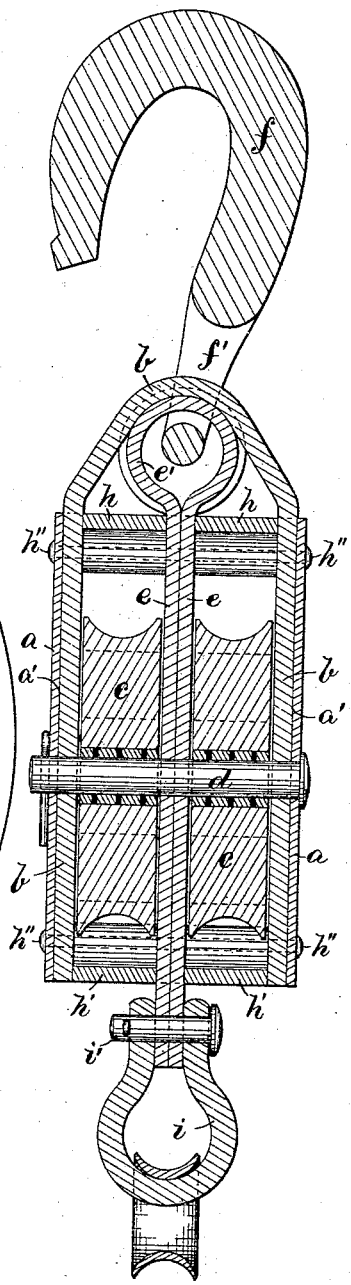

(No Model.)

T. R. FERRALL.
PULLEY BLOCK.

No. 279,554.

2 Sheets—Sheet 2.

Patented June 19, 1883.

Witnesses
Henry Chadbourn.
John H. Foster.

Inventor
Thomas R. Ferrall
by Alban Andrew
his atty

UNITED STATES PATENT OFFICE.

THOMAS R. FERRALL, OF BOSTON, MASSACHUSETTS.

PULLEY-BLOCK.

SPECIFICATION forming part of Letters Patent No. 279,554, dated June 19, 1883.

Application filed January 4, 1883. (No model.)

*To all whom it may concern:*

Be it known that I, THOMAS R. FERRALL, a citizen of the United States, residing at Boston, in the county of Suffolk and State of Massachusetts, have invented certain new and useful Improvements in Pulley-Blocks; and I do hereby declare that the same are fully described in the following specification and illustrated in the accompanying drawings.

This invention relates to improvements in pulley-blocks, and it is carried out as follows, reference being had to the accompanying drawings, where—

Figure 1 represents an end elevation of my improved all-metal block. Fig. 2 represents a vertical section on the line A B, shown in Fig. 1. Fig. 3 represents a central longitudinal section of the same. Fig. 4 represents a cross-section on the line C D, shown in Fig. 1.

Similar letters refer to similar parts wherever they occur on the different parts of the drawings.

$a\ a$ are the cast-metal sides of my improved block, each of such sides being provided with an internal or external vertical groove, $a'$, for the reception of the outer strap, $b$, preferably made of wrought-iron.

$c\ c$ are the usual pulleys, adapted to revolve loosely on the pin $d$, which passes through the outer strap, $b$, metal sides $a\ a$, and central or middle strap, $e$, the latter having an eye, $e'$, in its upper end, adjoining the loop $b'$ of the outer strap, $b$, as shown in Figs. 1, 2, and 3. To the eye $e'$ and the loop $b'$ is jointed the eye $f'$ of the hook $f$, as shown in the drawings. The partition-wall between the pulleys $c\ c$ is made in two halves, $g\ g$, of cast metal. In making said divided partition of metal, I make it with suitable perforations, $g'\ g'$, as shown in Figs. 2 and 4, so as to make it as light as possible. The outer edge, $g''$, of said partition is made thick and rounded, as shown in Fig. 4, so as to prevent the rope from chafing.

$h\ h$ are the upper, and $h'\ h'$ are the lower, end pieces, which separate the middle partition, $g\ g$, from the side pieces, $a\ a$, such end pieces being made of cast metal separate and independent of each other, and provided each with two perforations for the reception of the rivets $h''\ h''$, which pass through corresponding perforations in the sides $a\ a$ and partition $g\ g$, and by means of which the sides, middle, and end pieces of the block are securely riveted together, so that the outer and middle straps, $b$ and $e$, may be detached from the body of the block, in case the hook $f$ should get damaged or broken, without allowing the body of the block to go to pieces.

$i$ is the shackle, jointed to the lower end of middle strap, $e$, by means of hinge-pin $i'$, as shown in the drawings.

It will be seen that by constructing a pulley-block in the manner as shown and described no strain comes on the sides $a\ a$ and the middle partition, $g\ g$, which only serve as guides for the rope, and may therefore be as light as possible, and in practice I am able to make in this manner a brass or metal block which will weigh less than the ordinary wooden blocks, which is a great advantage. The whole strain of the block is taken up by the outer and middle wrought-iron straps, $b$ and $e$.

What I wish to secure by Letters Patent, and claim, is—

The herein-described pulley-block, consisting of the cast-metal sides $a\ a$, having grooves $a'\ a'$, for the reception of the wrought-iron strap $b$, combined with the middle metal strap, $e$, the perforated and halved cast-metal partition $g\ g$, riveted metal end pieces, $h'\ h'$, and pulleys $c\ c$, with pin $d$, as and for the purpose set forth.

In testimony whereof I have affixed my signature in presence of two witnesses.

THOMAS R. FERRALL.

Witnesses:
ALBAN ANDRÉN,
HENRY CHADBOURN.